No. 623,633. Patented Apr. 25, 1899.
I. SMITH.
PRUNING IMPLEMENT.
(Application filed July 14, 1898.)
(No Model.)
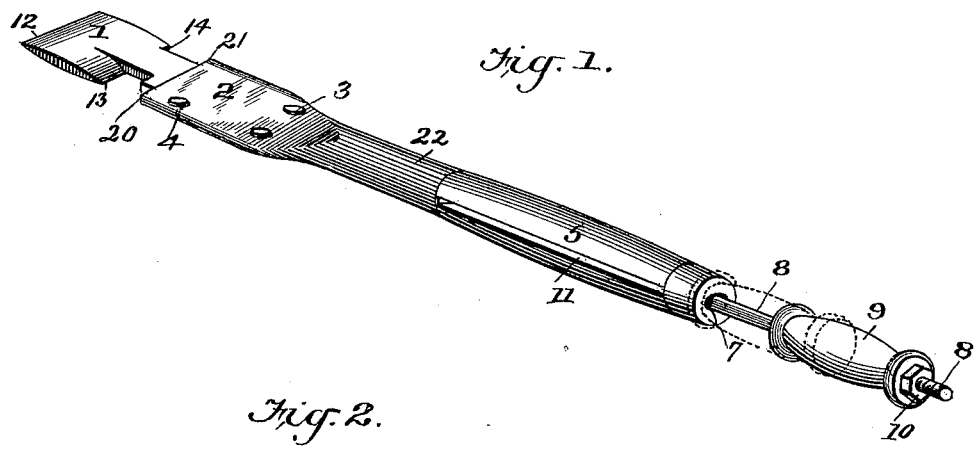
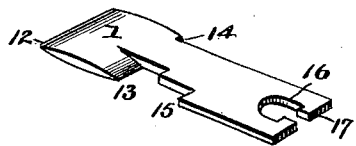
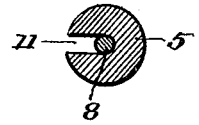
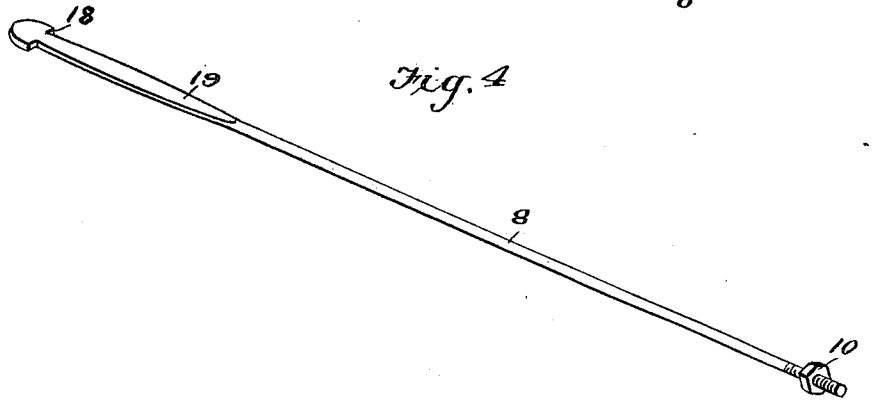
WITNESSES:
Jos. A. Ryan
Amos W. Hart
INVENTOR
Isaac Smith
BY Munn & Co.
ATTORNEYS.
THE NORRIS PETERS CO., PHOTO-LITHO., WASHINGTON, D. C.

UNITED STATES PATENT OFFICE.

ISAAC SMITH, OF SOUTH BEND, WASHINGTON.

PRUNING IMPLEMENT.

SPECIFICATION forming part of Letters Patent No. 623,633, dated April 25, 1899.

Application filed July 14, 1898. Serial No. 685,930. (No model.)

*To all whom it may concern:*

Be it known that I, ISAAC SMITH, a citizen of the United States, residing at South Bend, in the county of Pacific and State of Washington, have invented certain new and useful Improvements in Pruning Implements, of which the following is a specification.

My invention relates to pruning implements; and the objects thereof are to provide an improved device of this class which is particularly adapted for trimming and pruning branches of trees in a smooth and easy manner, with a further object of providing in the same implement a chisel to pare or smooth broken or jagged wood; and with these and other objects in view the invention consists in the construction, combination, and arrangement of parts hereinafter described and claimed.

The invention is fully disclosed in the following specification, of which the accompanying drawings form a part, in which—

Figure 1 is a perspective view of the improved pruning implement complete; Fig. 2, a perspective view of the cutter removed from the stock; Fig. 3, a section through handle 5, and Fig. 4 the reach-rod removed from stock.

Similar numbers refer to similar parts throughout the several views.

The device consists of a handle or stock 5, on which is fitted the socket 22, shaped at one end 2, as shown, to form a flattened sleeve-guide for a hook-shaped cutter-iron 1 to slide therein. The cutter-iron 1 is formed of the chisel edge 12, particularly described hereinafter, the pruning-knife edge 13, the shoulder 15, coming in contact with the pin or screw 4 in the socket for the purpose of preventing the cutter-iron 1 from projecting too far, a blunt end 17 to bear against the pin or screw 3 to guard the sharp cutting edge 13 against coming in contact with the end 20 of socket-head, and the shoulder 14, as shown, which may be used, if desirable, also as a guard to prevent the cutting edge striking by bearing directly against the socket itself at 21. The aperture 16 is for the purpose of locking the cutter-iron to the reach-rod 8, the end 18 of which fits snugly therein. The cutter and rod are thus detachably connected. The reach-rod, Figs. 1 and 4, is flattened at one end 19 to slide in the flattened part 2 of the socket 22 of the stock.

9 is the hammer-weight, of convenient form for a handhold, to be used for delivering blows to either the nut or collar 10 or upon the stock or handle, as required.

6 is the ferrule or cap to protect the end of handle, when of wood, from fracture on being struck by the hammer 9.

The device is assembled by passing the end 18 of reach-rod, Fig. 4, through the ferrule 6 and handle 5, the latter being slotted and grooved, (for the insertion of flattened end,) as shown at 7 and 11, respectively, putting the cutter-iron 1 on end of reach-rod, drawing them both back and inserting the pin or screw 4, and then putting on the hammer-weight 9 and the nut or collar 10, when it is complete.

The method of operating the implement is as follows: The cutter edge 13, hooking over the limb or branch to be severed or cut off, is forced against and into the branch (resting against the end 20 of stock) by means of the hammer-weight 9 striking repeated blows upon the nut or collar 10 on reach-rod, communicating through said rod the force of the blows to the cutter-knife.

As an addition to the pruning device I use the chisel edge 12 for the purpose of smoothing and cutting away wood. When operating this, the end 17 of the cutter-iron 1, resting against the pin 3, makes for all chiseling purposes a rigid tool to be struck by the hammer-weight 9.

My improved pruning device is simple in construction and operation and is perfectly adapted to accomplish the purposes for which it is intended, and it is apparent that changes in and modifications of the construction herein described may be made without departing from the spirit of my invention or sacrificing its advantages.

Having thus described my invention, what I claim as new, and desire to secure by Letters Patent, is—

1. In a pruning implement, the combined pruning hook and chisel, consisting of the cutter-iron provided with a chisel edge on the front portion thereof and a pruning-knife edge formed in the side, a handle, a socket secured thereon and adapted to receive the cutter-iron and permit the latter to slide therein, a reach-rod secured upon the rear of the cutter-iron, and a hammer-weight sliding upon the rod, and adapted to strike the end of the handle to operate the chisel, and a stop upon the rod to aid in operating the pruning-knife, substantially as described.

2. In a pruning implement, the combination with a hook-shaped cutter, a sliding rod, an extended guiding-handle, a weight or hammer adapted to slide on the portion of the rod that extends beyond such handle, and a stop applied to the rod exterior to said hammer, as shown and described.

3. In a pruning implement, the combination with a handle, the socket attached thereto and flattened at its outer end, the cutter fitted loosely in such socket, and the rod detachably connected with the cutter, for operating the same, as shown and described.

4. In a pruning implement, the combination of the connected sliding rod and cutter, the handle, the flattened socket in which the cutter is held and guided, and a stop 4 on the socket for arresting the movement of the cutter, as shown and described.

ISAAC SMITH.

Witnesses:
   JAMES MCWILLIAMS,
   PIERRE BARNES.